United States Patent
Vanbesien et al.

(10) Patent No.: US 9,074,105 B2
(45) Date of Patent: Jul. 7, 2015

(54) EMULSIFIED UV CURABLE INKS FOR INDIRECT PRINTING

(71) Applicant: XEROX CORPORATION, Norwalk, CT (US)

(72) Inventors: Daryl W. Vanbesien, Burlington (CA); Michelle N. Chretien, Mississauga (CA); Barkev Keoshkerian, Thornhill (CA); Jennifer L. Belelie, Oakville (CA); Jenny Eliyahu, Maple (CA); Naveen Chopra, Oakville (CA); Valerie M. Farrugia, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 2 days.

(21) Appl. No.: 14/067,325

(22) Filed: Oct. 30, 2013

(65) Prior Publication Data

US 2015/0119487 A1 Apr. 30, 2015

(51) Int. Cl.

| C08F 2/50 | (2006.01) |
|---|---|
| C08F 2/46 | (2006.01) |
| C08B 37/00 | (2006.01) |
| C08F 2/48 | (2006.01) |
| A61L 2/08 | (2006.01) |
| A61L 24/00 | (2006.01) |
| C08G 61/04 | (2006.01) |
| C09D 11/38 | (2014.01) |
| C09D 133/08 | (2006.01) |
| C08K 5/3432 | (2006.01) |
| C08K 5/20 | (2006.01) |
| C08K 5/3417 | (2006.01) |

(52) U.S. Cl.
CPC ............. *C09D 11/38* (2013.01); *C09D 133/08* (2013.01); *C08K 5/3432* (2013.01); *C08K 5/20* (2013.01); *C08K 5/3417* (2013.01)

(58) Field of Classification Search
USPC ............. 522/18, 12, 7, 13, 21, 222, 8, 6, 189, 522/184, 1; 520/1
See application file for complete search history.

(56) References Cited

U.S. PATENT DOCUMENTS

| 5,231,135 A | 7/1993 | Machell |
|---|---|---|
| 5,389,958 A | 2/1995 | Bui |
| 5,621,022 A | 4/1997 | Jaeger |
| 6,221,137 B1 | 4/2001 | King |
| 6,472,523 B1 | 10/2002 | Banning |
| 6,476,219 B1 | 11/2002 | Duff |
| 6,576,747 B1 | 6/2003 | Carlini |
| 6,576,748 B1 | 6/2003 | Carlini |
| 6,590,082 B1 | 7/2003 | Banning |
| 6,646,111 B1 | 11/2003 | Carlini |
| 6,663,703 B1 | 12/2003 | Wu |
| 6,673,139 B1 | 1/2004 | Wu |
| 6,696,552 B2 | 2/2004 | Mayo |
| 6,713,614 B2 | 3/2004 | Carlini |
| 6,726,755 B2 | 4/2004 | Titterington |
| 6,755,902 B2 | 6/2004 | Banning |
| 6,821,327 B2 | 11/2004 | Jaeger |
| 6,958,406 B2 | 10/2005 | Banning |
| 7,053,227 B2 | 5/2006 | Jaeger |
| 7,270,408 B2 | 9/2007 | Odell |
| 7,381,831 B1 | 6/2008 | Banning |
| 7,427,323 B1 | 9/2008 | Birau |
| 7,690,782 B2 | 4/2010 | Odell |
| 8,142,557 B2 | 3/2012 | Belelie |
| 2011/0262711 A1* | 10/2011 | Chopra et al. ................. 428/172 |
| 2012/0288789 A1* | 11/2012 | Mahabadi et al. ......... 430/108.2 |

OTHER PUBLICATIONS

U.S. Appl. No. 14/067,469, filed Oct. 30, 2013, entitled "Inkjet Ink Containing Polystyrene Copolymer Latex Suitable for Indirect Printing"; First Inventor: Jenny Eliyahu.
U.S. Appl. No. 14/067,074, filed Oct. 30, 2013, entitled "Electron Beam Curable Inks for Indirect Printing"; First Inventor: Michelle N. Chretien.
U.S. Appl. No. 14/067,054, filed Oct. 30, 2013, entitled "Photocurable Inks for Indirect Printing"; First Inventor: Michelle N. Chretien.
U.S. Appl. No. 14/067,152, filed Oct. 30, 2013, entitled "Curable Aqueous Latex Inks for Indirect Printing"; First Inventor: Jennifer L. Belelie.
U.S. Appl. No. 14/067,191, filed Oct. 30, 2013, entitled "Curable Latex Inks Comprising an Unsaturated Polyester for Indirect Printing"; First Inventor: Jennifer L. Belelie.
U.S. Appl. No. 14/067,240, filed Oct. 30, 2013, entitled "Emulsified Aqueous Ink Comprising Reactive Alkoxysilane for Indirect Printing"; First Inventor: Naveen Chopra.
U.S. Appl. No. 14/067,290, filed Oct. 30, 2013, entitled "Dual Component Inks Comprising Reactive Latexes for Indirect Printing"; First Inventor: Naveen Chopra.
U.S. Appl. No. 14/067,443, filed Oct. 30, 2013, entitled "Emulsified Electrorheological Inks for Indirect Printing"; First Inventor: Naveen Chopra.
U.S. Appl. No. 14/066,716, filed Oct. 30, 2013, entitled "Ink Jet Ink for Indirect Printing Applications"; First Inventor: Jenny Eliyahu.

* cited by examiner

*Primary Examiner* — Ling Choi
*Assistant Examiner* — Jessica E Whiteley
(74) *Attorney, Agent, or Firm* — Pillsbury Winthrop Shaw Pittman LLP

(57) ABSTRACT

An emulsified UV curable ink comprising water, an amide gellant, a curable monomer, a photoinitiator; which is suitable for use in an indirect printing method.

20 Claims, 1 Drawing Sheet

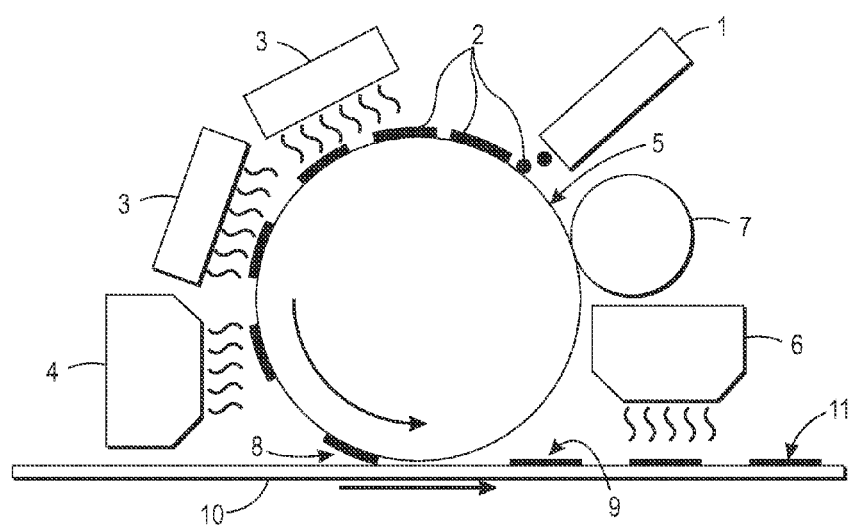

EMULSIFIED UV CURABLE INKS FOR INDIRECT PRINTING

CROSS-REFERENCE TO RELATED APPLICATIONS

This application is related to co-pending and co-owned U.S. patent application Ser. No. 14/067,469, entitled "INKJET INK CONTAINING POLYSTYRENE COPOLYMER LATEX SUITABLE FOR INDIRECT PRINTING", filed herewith, U.S. patent application Ser. No. 14/067,054, entitled "PHOTOCURABLE INKS FOR INDIRECT PRINTING", filed herewith, U.S. patent application Ser. No. 14/067,152, entitled "CURABLE AQUEOUS LATEX INKS FOR INDIRECT PRINTING", filed herewith, U.S. patent application Ser. No. 14/067,191, entitled "CURABLE LATEX INKS COMPRISING AN UNSATURATED POLYESTER FOR INDIRECT PRINTING", filed herewith, each of the foregoing being incorporated herein by reference in its entirety.

INTRODUCTION

The presently disclosed embodiments are related generally to an emulsified UV curable ink composition for an indirect printing method.

The indirect printing process is a two-step printing process wherein the ink is first applied imagewise onto an intermediate receiving member (drum, belt, etc.) using an inkjet printhead. The ink wets and spreads onto the intermediate receiving member to form a transient image. The transient image then undergoes a change in properties (e.g., partial or complete drying, thermal or photo-curing, gelation etc.) and the resulting transient image is then transferred to the substrate.

Inks suitable for such indirect printing process may be designed and optimized to be compatible with the different subsystems, such as, jetting, transfer, etc., that enable high quality printing at high speed. Typically, inks that display good wettability do not transfer onto a substrate, or conversely inks that transfer efficiently to the substrate do not wet the intermediate receiving member. To date, there is no commercially available ink that enables both the wetting and the transfer functions.

Thus, there exists a need to develop an ink suitable for indirect printing process, and particularly, there exists a need to develop an ink that exhibits good wetting of the intermediate receiving member and is capable of efficient transfer to the final substrate.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided an emulsified UV curable ink for use in an indirect printing process comprising water, a curable monomer, a photoinitiator, and an amide gellant having the formula

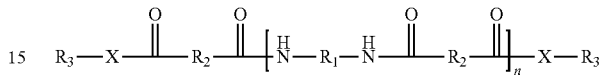

wherein $R_1$ is: (i) an alkylene group having from 1 to about 20 carbon atoms, (ii) an arylene group having from about 5 to about 20 carbon atoms, (iii) an arylalkylene group having from about 6 to about 32 carbon, or (iv) an alkylarylene group having from about 6 to about 32 carbon atoms; $R_2$ is: (i) alkylene groups having from 1 to about 54 carbon atoms, (ii) arylene groups having from 5 to about 14 carbon atoms in the arylene chain, (iii) arylalkylene groups having from about 6 to about 32 carbon atoms, or (iv) alkylarylene groups having from about 6 to about 32 carbon; $R_3$ is: (i) alkyl groups, (ii) aryl groups, (iii) arylalkyl groups, or (iv) alkylaryl groups; X is an oxygen atom or a group of the formula $-NR_4-$, wherein $R_4$ is: (i) a hydrogen atom, (ii) an alkyl group, (iii) an aryl group, (iv) an arylalkyl group, or (v) an alkylaryl group; and n is from about 1 to about 20; wherein the ink has a surface tension of from about 18 to about 50 mN/m and a viscosity of from about 2 centipoise to about 20 centipoise at the jetting temperature.

In particular, the present embodiments provide an emulsified UV curable ink for use in an indirect printing process comprising water, a curable monomer, a photoinitiator; and an amide gellant having the formula

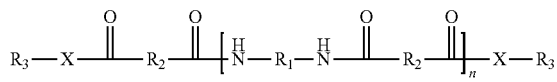

wherein $R_1$ is an alkylene group, $R_2$ is an alkylene group, and $R_3$ has a formula of $-(CH_2)_p-O-A$ wherein A is a substituted aryl or non-substituted aryl, x is O, and n is from about 1 to about 5; wherein the ink has a surface tension of from about 18 to about 50 mN/m and a viscosity of from about 2 centipoise to about 20 centipoise at the jetting temperature.

In further embodiments, there is provided an emulsified UV curable ink for use in an indirect printing process comprising water, a curable monomer, a photoinitiator; and an amide gellant having the formula

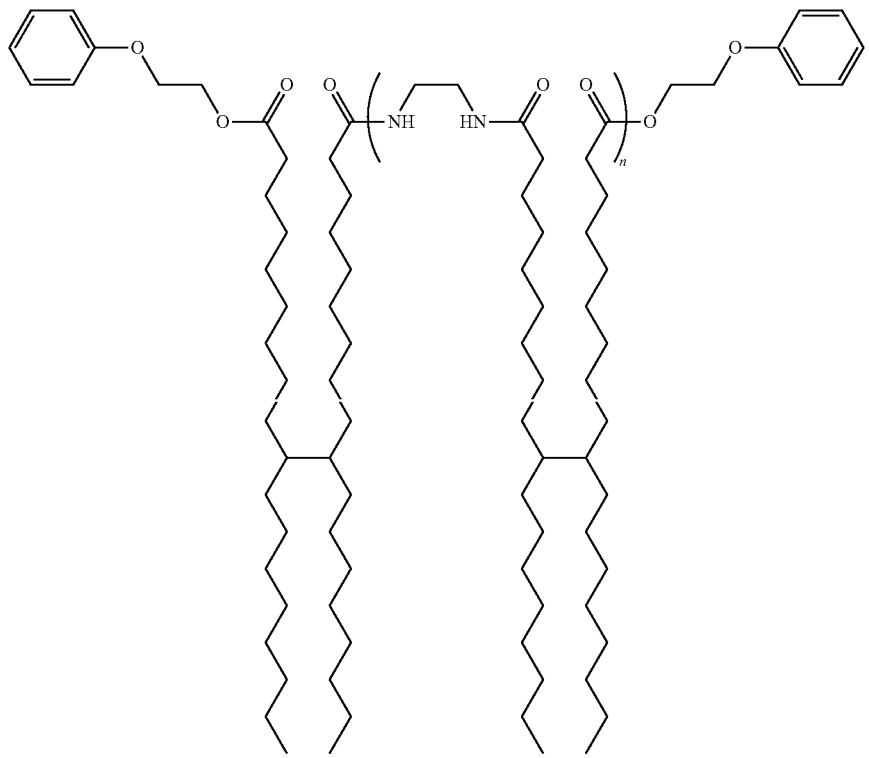

wherein n is from about 1 to about 20; wherein the ink has a surface tension of from about 18 to about 50 mN/m and a viscosity of from about 2 centipoise to about 20 centipoise at the jetting temperature.

BRIEF DESCRIPTION OF THE DRAWINGS

For a better understanding of the present embodiments, reference may be made to the accompanying figures.

FIG. 1 is a diagrammatical illustration of an imaging member in accordance with the present embodiments for applying a two-step transfer and curing process in an indirect printing system.

DETAILED DESCRIPTION

In the following description, it is understood that other embodiments may be utilized and structural and operational changes may be made without departure from the scope of the present embodiments disclosed herein.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The term "curable" describes, for example, a material that may be cured via polymerization, including for example free radical routes, and/or in which polymerization is photoinitiated though use of a radiation-sensitive photoinitiator. The term "radiation-curable" refers, for example, to all forms of curing upon exposure to a radiation source, including light and heat sources and including in the presence or absence of initiators. Exemplary radiation-curing techniques include, but are not limited to, curing using ultraviolet (UV) light, for example having a wavelength of 200-400 nm or more rarely visible light, optionally in the presence of photoinitiators and/or sensitizers, curing using electron-beam (i.e., e-beam) radiation, optionally in the absence of photoinitiators, curing using thermal curing, in the presence or absence of high-temperature thermal initiators (and which may be largely inactive at the jetting temperature), and appropriate combinations thereof.

As used herein, the term "viscosity" refers to a complex viscosity, which is the typical measurement provided by a mechanical rheometer that is capable of subjecting a sample to a steady shear strain or a small amplitude sinusoidal deformation. In this type of instrument, the shear strain is applied by the operator to the motor and the sample deformation (torque) is measured by the transducer. Examples of such instruments are the Rheometrics Fluid Rheometer RFS3 or the ARES mechanical rheometer, both made by Rheometrics, a division of TA Instruments. The present embodiments disclose emulsified UV curable inks for an indirect print process, or indirect printing ink jet applications.

The emulsified UV curable ink of the present embodiments may possess the required surface tension (in the range of 15-50 mN/m), viscosity (in the range of 3-20 cps), and particle size (<600 nm) for use in an inkjet (e.g., piezoelectric) printhead.

In embodiments, the ink has a surface tension of from about 15 mN/m to about 50 mN/m, for example from about 18 mN/m to about 40 mN/m, or from about 20 mN/m to about 30 mN/m.

In embodiments, the ink has a viscosity of from about 2 cps to about 20 cps, for example from about 3 cps to about 15 cps, or from about 4 cps to about 12 cps, at the temperature of jetting. In particular embodiments, the ink compositions are jetted at temperatures of less than about 70° C., such as from about 25° C. to about 70° C., or from about 30° C. to about 50° C., such as from about 30° C. to about 40° C.

In embodiments, the ink has an average pigment particle size of less than about 600 nm, for example from about 25 nm to about 500 nm, or from about 50 nm to about 300 nm.

FIG. 1 discloses a diagrammatical illustration of an imaging system in accordance with the present embodiments for applying a two-step transfer and curing process whereby an ink of the present disclosure is printed onto an intermediate transfer surface for subsequent transfer to a receiving substrate. During the indirect print process, the ink of the present embodiments is jetted and spread onto an intermediate receiving member 5 via an inkjet 1. The intermediate receiving member 5 may be provided in the form of a drum, as shown in FIG. 1, but may also be provided as a web, platen, belt, band or any other suitable design.

Referring again to FIG. 1, the intermediate receiving member 5 may be heated by a heater device 3 to remove the water content (partially or fully) in the ink vehicle of ink 2. Optionally, the ink image may be partially cured by UV light 4 (e.g., 370-420 nm) prior to transfer to reduce film splitting as required. Using long wavelength light for the pre-cure step results in polymerization in the bulk of the ink down to the ink/transfer substrate interface while leaving the surface largely uncured. This partially cured state should enable both release from the transfer substrate, due to increased cohesion, and transfer to the final substrate, due to the tacky surface of the uncured ink film. The resulting ink film includes an amide gellant, monomers and/or oligomers which may or may not be partially cured, additives, and optional colorants. The ink film (i.e., ink image 8) may be then transferred under controlled temperature and pressure from the intermediate receiving member 5 to the final receiving substrate 10. The transfer of the ink image may be performed through contact under pressure. The transferred image 9 is then further subjected to UV light 6 (e.g., 250-420 nm) to induce complete crosslinking thereby resulting in a robust image 11.

It is important to note that an ink suitable for an indirect printing process must be able to wet the intermediate receiving member 5 to enable formation of the transient image 2, and undergo a stimulus induced property change to enable release from the intermediate receiving member 5 in the transfer step.

Amide Gellants

The ink of the present embodiments includes an amide gellant. The amide gellant includes those disclosed in U.S. Pat. No. 8,142,557, which is incorporated by reference in its entirely herein. The amide gellant may have a formula

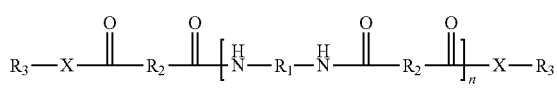

wherein:

$R_1$ is: (i) an alkylene group (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), with from, for example, 1 to about 20 carbon atoms in the alkylene chain, such as from 1 to about 12 or from 1 to about 4 carbon atoms, (ii) an arylene group (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), with from, for example, about 5 to about 20 carbon atoms in the arylene chain, such as from about 6 to about 14 or from about 6 to about 10 carbon atoms, (iii) an arylalkylene group (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), with from, for example, about 6 to about 32 carbon atoms in the arylalkylene chain, such as from about 7 to about 22 or from about 7 to about 20 carbon atoms, or (iv) an alkylarylene group (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), with from, for example, about 6 to about 32 carbon atoms in the alkylarylene chain, such as from about 7 to about 22 or from about 7 to about 20 carbon atoms, wherein the substituents on the substituted alkylene, arylene, arylalkylene, and alkylarylene groups can be, for example, halogen atoms, cyano groups, pyridine groups, pyridinium groups, ether groups, aldehyde groups, ketone groups, ester groups, amide groups, carbonyl groups, thiocarbonyl groups, sulfide groups, nitro groups, nitroso groups, acyl groups, azo groups, urethane groups, urea groups, mixtures thereof, and the like, wherein two or more substituents can be joined together to form a ring;

$R_2$ is: (i) alkylene groups (wherein an alkylene group is defined as a divalent aliphatic group or alkyl group, including linear and branched, saturated and unsaturated, cyclic and acyclic, and substituted and unsubstituted alkylene groups, and wherein heteroatoms, such as oxygen, nitrogen, sulfur, silicon, phosphorus, boron, and the like either may or may not be present in the alkylene group), with from, for example, 1 to about 54 carbon atoms in the alkylene chain, such as from 1 to about 44 or from 1 to about 36 carbon atoms, (ii) arylene groups (wherein an arylene group is defined as a divalent aromatic group or aryl group, including substituted and unsubstituted arylene groups, and wherein heteroatoms, such as oxygen, nitrogen, sulfur, silicon, phosphorus, boron, and the like either may or may not be present in the arylene group), with from, for example, 5 to about 14 carbon atoms in the arylene chain, such as from 6 to about 14 or from 7 to about 10 carbon atoms, (iii) arylalkylene groups (wherein an arylalkylene group is defined as a divalent arylalkyl group, including substituted and unsubstituted arylalkylene groups, wherein the alkyl portion of the arylalkylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the arylalkylene group), with from, for example, about 6 to about 32 carbon atoms in the arylalkylene chain, such as from about 7 to about 22 or from about 8 to about 20 carbon atoms, or (iv) alkylarylene groups (wherein an alkylarylene group is defined as a divalent alkylaryl group, including substituted and unsubstituted alkylarylene groups, wherein the alkyl portion of the alkylarylene group can be linear or branched, saturated or unsaturated, and cyclic or acyclic, and wherein heteroatoms, such as oxygen, nitrogen, sulfur, silicon, phosphorus, boron, and the like either may or may not be present in either the aryl or the alkyl portion of the alkylarylene group), with from, for example, about 6 to about 32 carbon atoms in the alkylarylene chain, such as from about 7 to about 22 or from about 7 to about 20 carbon atoms, wherein the substituents on the substituted alkylene, arylene, arylalkylene, and alkylarylene groups can be, for example, halogen atoms, cyano groups, ether groups, aldehyde groups, ketone groups, ester groups, amide groups, carbonyl groups, thiocarbonyl groups, phosphine groups, phosphonium groups, phosphate groups, nitrile groups, mercapto groups, nitro groups, nitroso groups, acyl groups, acid anhydride groups, azide groups, azo groups, cyanato groups, urethane groups, urea groups, mixtures thereof, and the like, wherein two or more substituents can be joined together to form a ring;

$R_3$ is (i) alkyl groups, including linear and branched, saturated and unsaturated, cyclic and acyclic, and substituted and unsubstituted alkyl groups, and wherein heteroatoms either may or may not be present in the alkyl group, (ii) aryl groups, including substituted and unsubstituted aryl groups, wherein heteroatoms either may or may not be present in the aryl group, (iii) arylalkyl groups, including substituted and unsubstituted arylalkyl groups, wherein the alkyl portion of the arylalkyl group can be linear or branched, saturated or unsaturated, and cyclic or acyclic, and wherein heteroatoms either may or may not be present in either the aryl or the alkyl portion of the arylalkyl group, or (iv) alkylaryl groups, including substituted and unsubstituted alkylaryl groups, wherein the alkyl portion of the alkylaryl group can be linear or branched, saturated or unsaturated, and cyclic or acyclic, and wherein heteroatoms either may or may not be present in either the aryl or the alkyl portion of the alkylaryl group; X is an oxygen atom or a group of the formula —$NR_4$—, wherein $R_4$ is: (i) a hydrogen atom, (ii) an alkyl group, comprising linear or branched, saturated or unsaturated, cyclic or acyclic, and substituted or unsubstituted alkyl groups, and wherein heteroatoms either may or may not be present in the alkyl group, (iii) an aryl group, comprising substituted or unsubstituted aryl groups, and wherein heteroatoms either may or may not be present in the aryl group, (iv) an arylalkyl group, comprising substituted or unsubstituted arylalkyl groups, wherein the alkyl portion of the arylalkyl group can be linear or branched, saturated or unsaturated, or cyclic or acyclic, or wherein heteroatoms either may or may not be present in either the aryl or the alkyl portion of the arylalkyl group, or (v) an alkylaryl group, comprising substituted and unsubstituted alkylaryl groups, wherein the alkyl portion of the alkylaryl group can be linear or branched, saturated or unsaturated, or cyclic or acyclic, and wherein heteroatoms either may or may not be present in either the aryl or the alkyl portion of the alkylaryl group; and n is from about 1 to about 20, from about 1 to about 15, from about 1 to about 10, or from about 1 to about 5.

In one specific embodiment, $R_2$ is the formula —$C_{34}H_{56+a}$— and are branched alkylene groups which may include unsaturations and cyclic groups, wherein a is an integer of 0, 1, 2, 3, 4, 5, 6, 7, 8, 9, 10, 11, or 12, including, for example, isomers of the formula

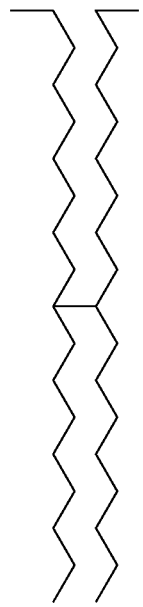 [SMILES: CCCCCCCCCC(CCCCCCCC)C(CCCCCCCC)CCCCCCCCC]

In one embodiment, $R_1$ is an ethylene (—$CH_2CH_2$—) group.

In embodiments, $R_3$ is —$(CH_2)_p$—O-A, where p is from about 1 to about 5, from about 1 to about 3, or 2, and A is a substituted aryl or heteroaryl group, where may be substituted with a hydroxyl group, or an alkyl group having from about 1 to 10 carbon atoms, the alkyl group may be linear, branched or cyclic, and the alkyl group may further be substituted with hydroxyl, oxo, alkyl, halo, or mixtures thereof.

In one embodiment, $R_3$ is

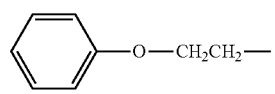

In embodiments, the gellant is of the formula

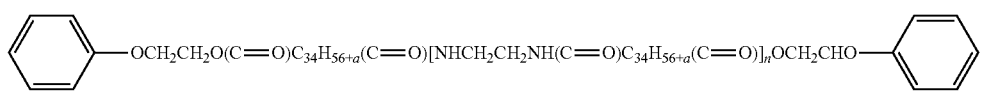

wherein —$C_{34}H_{56+a}$— represents a branched alkylene group which may include unsaturations and cyclic groups, wherein a is an integer of 0, 1, 2, 3, 4, 5, 6, 7, 8, 9, 10, 11, or 12, and n is 1 to about 20, from about 1 to about 15, from about 1 to about 10, or from about 1 to about 5, including, for example, isomers of the formula

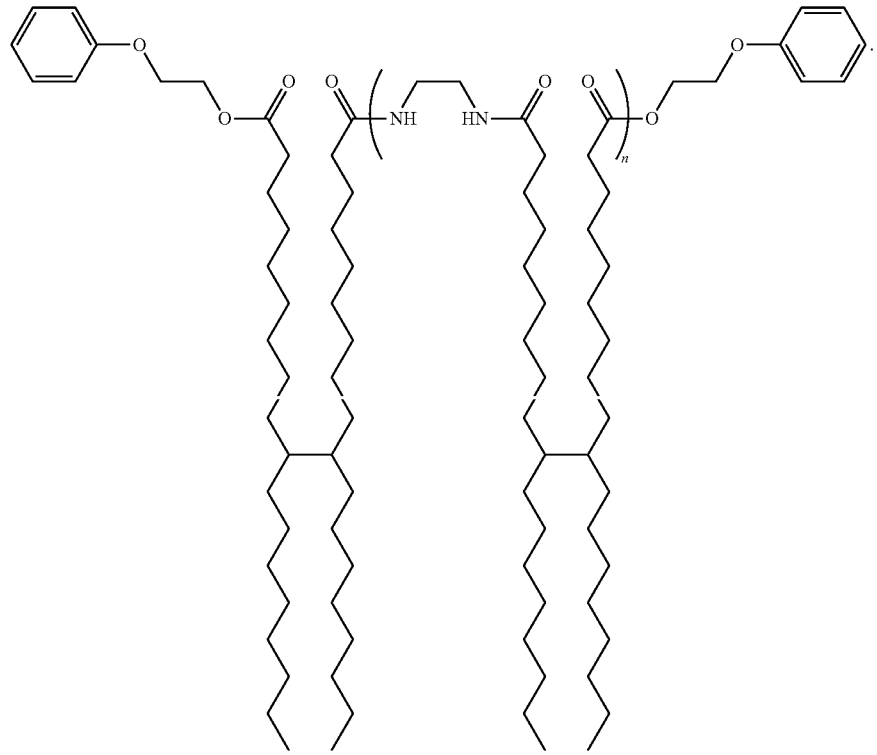

The amide gellant can be prepared according to the following reaction Scheme 1:

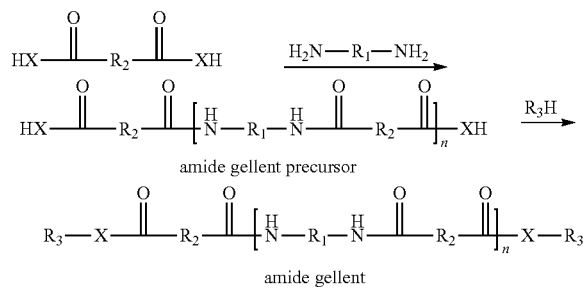

By varying the molar ratio of diamine ($H_2NR_1NH_2$) to the reagent ($XHCOR_2COXH$) in the reaction, the number of repeating unit (represented by n) of the amide gellant precursor (or amide gellant) changes. For example, if n is desired to be 1, the molar ratio of diamine to the reagent (e.g., diacid), would be about 1:2. Further synthetic detail is disclosed in U.S. Pat. No. 8,142,557, which is incorporated by reference herein.

The amide gellant may be present in an amount of from about 0.5 to about 2.5 weight percent, from about 0.75 to about 1.75 weight percent, or from about 1.05 to about 1.75 weight percent based on the total weight of the emulsified UV curable ink.

Radiation Curable Monomers and Oligomers

In embodiments, the photocurable ink includes a radiation curable material. Examples of radiation curable materials include any suitable curable monomer, and/or oligomer. In embodiments, the curable monomer is a monofunctional acrylate monomer, a multifunctional acrylate monomer, a monofunctional methacrylate monomer, a multifunctional methacrylate monomer, or mixtures thereof. In embodiments, the curable monomer is a methacrylate monomer, acrylate monomer, dimethacrylate monomer, diacrylate monomer, triacrylate monomer, and mixtures thereof. Examples of curable monomer compounds include, such as acrylate and methacrylate monomer compounds. Specific examples of curable monomers include, for example, 3,3,5,trimethylcyclohexyl methacrylate (e.g., CD421®), dicyclopentadienyl methacrylate (e.g., CD535®) diethylene glycol methyl ether methacrylate (e.g., CD545®), methoxy polyethylene glycol (550) monoacrylate monomer (CD553®), alkoxylated tetrahydrofurfuryl acrylate (e.g., CD611®), ethoxylated (4) nonyl phenol methacrylate (e.g., CD612®), ethoxylated nonyl phenol acrylate (e.g., CD613®), triethylene glycol ethyl ether methacrylate (e.g., CD730®), monofunctional acid ester (e.g., CD9050®), alkoxylated lauryl acrylate (e.g., CD9075®), alkoxylated phenol acrylate (e.g., CD9087®), tetrahydrofurfuryl methacrylate (e.g., SR203®), isodecyl methacrylate (e.g., SR242®), 2(2-ethoxyethoxy) ethyl acrylate (e.g., SR256®), stearyl acrylate (e.g., SR257®), tetrahydrofurfuryl acrylate (e.g., SR285®), lauryl methacrylate (e.g., SR313A®), stearyl methacrylate (e.g., SR324®), lauryl acrylate (e.g., SR335®), 2-phenoxylethyl acrylate (e.g., SR339®), 2-phenoxylethyl methacrylate (e.g., SR340®), isodecyl acrylate (e.g., SR395®), isobornyl methacrylate (e.g., SR423®), isooctyl acrylate (e.g., SR440®), octadecyl acrylate (SR484®), tridecyl acrylate (SR489®), tridecyl methacrylate (SR493®), caprolactone acrylate (e.g., SR495®), ethoxylated (4) nonyl phenol acrylate (e.g., SR504®), isobornyl acrylate (e.g., SR506A®), cyclic trimethylolpropane formal acrylate (e.g., SR531®), methoxy polyethylene glycol (350) monomethacrylate (e.g., SR550®), polyethylene glycol (400) dimethacrylate (SR603®), polyethylene glycol (600) diacrylate (e.g., SR610®), polypropylene glycol (400) dimethacrylate (e.g., SR644®), polyethylene glycol (1000) dimethacrylate (e.g., SR740®), tricyclodecane dimethanol diacrylate (e.g., SR833S®), propoxylated (2) neopentyl glycol diacrylate (e.g., SR9003®), alkoxylated neopentyl glycol diacrylate (e.g., SR9045®), alkoxylated aliphatic diacrylate (e.g., SR9209A®), dipropylene glycol diacrylate (e.g., SR508®), and the like, as well as mixtures thereof. All of the monomers disclosed above are commercially available from Sartomer Co. Inc.

The viscosity of the curable acrylate monomers is typically from about 1 to about 150 cps, from about 2 to about 145 cps, or from about 3 to about 140 cps at 25° C.

Specific examples of curable oligomers include, for example, diacrylate oligomer (e.g., CN132®), aliphatic monoacrylate oligomer (e.g., CN152®), aromatic monoacrylate oligomer (e.g., CN131®), acrylic oligomer (e.g., CN2285®), tetrafunctional acrylic oligomer (e.g., CN549®), and the like, as well as mixtures thereof. All of the oligomers disclosed above are commercially available from Sartomer Co. Inc.

The viscosity of the curable acrylate oligomers is typically from about 50 to about 1200 cps, from about 75 to about 1100 cps, or from about 100 to about 1000 cps at 25° C.

The monomer, oligomer, or mixtures thereof, can be present in any suitable amount. In embodiments, the monomer, oligomer, or mixtures thereof is present in an amount of from about 15 to about 20%, or from about 15 to about 19%, or from about 15 to about 18%, by weight based on the total weight of the emulsified UV curable ink.

Photoinitiators

The ink of the present embodiments may include one or more photoinitiator. In embodiments, the photoinitiators include benzophenone, hydroxyketones (e.g., alpha-hydroxyketones), aminoketones (e.g., alpha-aminoketones), phenylglyoxylates, acylphosphine oxides, and mixtures thereof. Specific examples of photoinitiators include benzophenone; 1-hydroxycyclohexylphenyl ketone, such as, for example, Irgacure® 184 (BASF Corp.) having the structure:

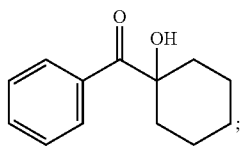 [SMILES: O=C(c1ccccc1)C1(O)CCCCC1]

(1-hydroxy-cyclohexyl-phenyl-ketone) alpha-hydroxy ketone, such as, for example Irgacure® 500 (BASF Corp.) which is a 1:1 mixture of Irgacure® 184 and benzophenone; Esacure® TZT (eutectic mixture of 2,4,6-trimethylbenzophenone and 4-methylbenzophenone), Esacure KIP 100F (benzophenone (50 wt %) liquid recrystallization below 18° C.), Esacure® KL 200 (2-hydroxy-2-methyl-1-phenyl-1-propanone, 100% active liquid), Darocur® 1173 (2-Hydroxy-2-methyl-1-phenyl-1-propanone), Irgacure® 2959 (2-Hydroxy-1-[4-(2-hydroxyethoxyl)phenyl]-2-methyl-1-propanone), Darocur® 4265 (1:1 wt % mixture of Darocur® TPO and Darocur® 1173), Irgacure® 2022 (1:4 wt % mixture of Irgacure® 819 and Darocur® 1173), Esacure KIP 150 (Oligo[2-hydroxy-2-methyl-1-[4-(1-methylvinyl)phenyl] propanone]/semi solid), Esacure KIP 75LT (Oligo[2-hydroxy-2-methyl-1-[4-(1-methylvinyl)phenyl]propanone]/ liquid mixture diluted with 25% of TPGDA (Tripropyleneglycol diacrylate), Esacure® KIP IT (Oligo[2-hydroxy-2-methyl-1-[4-(1-methylvinyl)phenyl]propanone]/ liquid mixture diluted with 35% of Propoxylated glycerol triacrylate, Irgacure® 369 (2-Benzyl-2-(dimethylamino)-1-[4-(4-morpholinyl)phenyl]-1-butanone), Irgacure® 379 (2-dimethylamino-2-(4-methyl-benzyl)-1-(4-morpholin-4-yl-phenyl)-butan-1-one, Irgacure® 907 (2-Methyl-1-[4-(methylthio)phenyl]-2-(4-morpholinyl)-1-propanone), Irgacure® 1300 (3:7 wt % mixture of Irgacure® 369 and Irgacure® 651); Irgacure® 651 (2,2'-dimethoxy-1,2-diphenylethan-1-one); acylphosphone oxide such as ethyl-2,4,6-trimethylbenzoylphenylphosphinate having the structure:

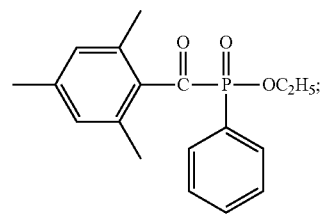 [SMILES: CCOP(=O)(C(=O)c1c(C)cc(C)cc1C)c1ccccc1]

for example, Lucirin TPO-L (BASF Corp.), Irgacure® 2022 (1:4 wt % mixture of Irgacure® 819 and Darocur® 1173), Irgacure® 2100 (liquid blend of acylphosphine oxides); Lucirin® TPO (2,4,6-trimethylbenzoyl-diphenylphosphine oxide), Darocur® 4265 (1:1 mixture wt % of Lucirin® TPO and Darocur® 1173); phenylglyoxylate such as Dacrocur® MBF (BASF Corp.) (phenyl glyoxylic acid methyl ester), Irgacure® 754 (oxy-phenyl-acetic acid 2-[2 oxo-2-phenyl-acetoxy-ethoxy]-ethyl ester and oxy-phenyl-acetic 2-[2-hydroxy-ethoxy]-ethyl ester); and mixtures thereof.

Table 1 below shows the UV absorption range of the commercial photoinitators.

TABLE 1

| Photoinitiator | Chemical Name | UV/VIS absorption peaks (nm) |
|---|---|---|
| Esacure KL 200 | 2-hydroxy-2-methyl-1-phenyl-1-propanone 100% active liquid | 245, 280, 331 |
| Irgacure 184 | 1-Hydroxy-cyclohexyl-phenyl-ketone | 246, 280, 333 |
| Irgacure 500 | IRGACURE 184 (50 wt %), benzophenone (50 wt %) | 250, 332 |
| Darocur 1173 | 2-Hydroxy-2-methyl-1-phenyl-1-propanone | 245, 280, 331 |
| Irgacure 2959 | 2-Hydroxy-1-[4-(2-hydroxyethoxy) phenyl]-2-methyl-1-propanone | 276, 331 |
| Darocur 4265 | DAROCUR TPO (50 wt %) + DAROCUR 1173 (50 wt %) | 240, 290, 380 |
| Irgacure 2022 | IRGACURE 819 (20 wt %) + DAROCUR 1173 (80 wt %) | 246, 282, 370 |
| Esacure KIP 100F | liquid mixture of Esacure KIP 150, 70 wt % and Esacure KL 200, 30 wt % | induces surface cure |
| Esacure One | n/a | induces surface cure |

TABLE 1-continued

| Photoinitiator | Chemical Name | UV/VIS absorption peaks (nm) |
|---|---|---|
| Esacure KIP 150 | Oligo[2-hydroxy-2-methyl--1-[4-(1-methylvinyl)phenyl]propanone] | induces surface cure |
| Esacure KIP 75LT | Oligo[2-hydroxy-2-methyl--1[4-(1-methylvinyl)phenyl]propanone] | induces surface cure |
| Esacure KIP IT | Oligo[2-hydroxy-2-methyl--1-[4-(1-methylvinyl)phenyl]propanone] | induces surface cure |
| Lucirin TPO | 2,4,6-trimethylbenzoyl-diphenylphosphine oxide | 295, 380, 393 |
| Lucirin TPO-L | ethyl-2,4,6-trimethylbenzoylphenylphosphinate | 242, 280, 370 |
| Irgacure 819 | Phosphine oxide, phenyl bis (2,4,6-trimethyl benzoyl) | 360, 365, 405 |
| Irgacure 2100 | liquid blend of acylphosphine oxides | 275, 370 |
| Irgacure 369 | 2-benzyl-2-dimethylamino-1-(4-morpholinophenyl)-butan-1-one | 233, 324 |
| Irgacure 379 | 2-dimethylamino-2-(4-methyl-benzyl)-1-(4-morpholin-4-yl-phenyl)-butan-1-one | 237, 320 |
| Irgacure 907 | 2-Methyl-1-[4-(methylthio)phenyl]-2-(4-morpholinyl)-1-propanone | 232, 240, 307 |
| Irgacure 651 | Alpha, alpha-dimethoxy-alpha-phenylacetophenone | 254, 337 |
| Darocur MBF | Methylbenzoylformate | 255, 325 |
| Irgacure 754 | oxy-phenyl-acetic acid 2-[2 oxo-2 phenyl-acetoxy-ethoxy]-ethyl ester and oxy-phenyl-acetic 2-[2-hydroxy-ethoxy]-ethyl ester | 260, 345 |

The total amount of photoinitiator included in the emulsified UV curable ink composition may be from, for example, from about 0.5 to about 4 percent, such as from about 0.75 to about 3 percent, or from about 1 to about 2.5 percent by weight of the total emulsified UV curable ink composition.

Surfactants

The inks disclosed may also contain a surfactant. Examples of suitable surfactants include ionic surfactants, anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™, and ANTAROX 897™. Other examples of suitable nonionic surfactants include a block copolymer of polyethylene oxide and polypropylene oxide, including those commercially available as SYNPERONIC™ PE/F, such as SYNPERONIC™ PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Sigma-Aldrich, NEOGEN R™, NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C 12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used.

The optional surfactant can be present in any desired or effective amount. In embodiments, the surfactant is present in an amount of from about 0.01 to about 5 percent by weight, based on the total weight of the ink composition. It should be noted that the surfactants are named as dispersants in some cases.

Colorants

In embodiments, the colorant may include a pigment, a dye, combinations thereof, black, cyan, magenta, yellow, red, green, blue, brown, combinations thereof, in an amount sufficient to impart the desired color to the ink.

The colorant may be provided in the form of a colorant dispersion. In embodiments, the colorant dispersion has an average particle size of from about 20 to about 500 nanometers (nm), or from about 20 to about 400 nm, or from about 30 to about 300 nm. In embodiments, the colorant is selected from the group consisting of dyes, pigments, and combinations thereof, and optionally, the colorant is a dispersion comprising a colorant, an optional surfactant, and an optional dispersant.

Examples of suitable dyes include Neozapon Red 492 (BASF); Orasol Red G (Ciba); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Cibanon Yellow 2GN (Ciba); Orasol Black CN (Ciba); Savinyl Black RLSN (Clariant); Pyrazol Black BG (Clariant); Morfast Black 101 (Rohm & Haas); Diaazol Black RN (ICI); Orasol Blue GN (Ciba); Savinyl Blue GLS (Clariant); Luxol Fast Blue MBSN (Pylam Products); Sevron Blue 5GMF (Classic Dyestuffs); Basacid Blue 750 (BASF), Neozapon Black X51 (BASF), Classic Solvent Black 7 (Classic Dyestuffs), Sudan Blue 670 (C.I. 61554) (BASF), Sudan Yellow 146 (C.I. 12700) (BASF), Sudan Red 462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the curable phase change inks. Examples of suitable pigments include PALIOGEN Violet 5100 (commercially available from BASF); PALIOGEN Violet 5890 (commercially available from BASF); HELIOGEN Green L8730 (commercially available from BASF); LITHOL Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); ORACET Pink RF (commercially available from Ciba); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO1 (commercially available from Clariant); IRGALITE Blue BCA (commercially available from BASF); PALIOGEN Blue 6470 (commercially available from BASF); Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVOPERM Yellow FGL (commercially available from Clariant); Ink Jet Yellow 4G VP2532 (commercially available from Clariant); Toner Yellow HO (commercially available from Clariant); Lumogen Yellow D0790 (commercially available from BASF); Suco-Yellow L1250 (commercially available from BASF); Suco-Yellow D1355 (commercially available from BASF); Suco Fast Yellow DI 355, DI 351 (commercially available from BASF); HOSTAPERM Pink E 02 (commercially available from Clariant); Hansa Brilliant Yellow 50X03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from DU PONT); PALIOGEN Black L0084 (commercially available from BASF); Pigment Black K801 (commercially available from BASF); and carbon blacks such as REGAL 330™ (commercially available from Cabot), Nipex 150 (commercially available from Degusssa) Carbon Black 5250 and Carbon Black 5750 (commercially available from Columbia Chemical), and the like, as well as mixtures thereof.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, the colorant may be included in the ink in an amount of, for example, about 0.1 to about 10%, or from about 0.1 to about 7.5%, or from about 0.1 to about 5% by weight of the emulsified UV curable ink.

The ink compositions described herein may be jetted at temperatures of less than about 70° C., such as from about 25° C. to about 70° C., or from about 30° C. to about 50° C. The ink compositions are thus ideally suited for use in piezoelectric ink jet devices.

In a specific embodiment, a process herein comprises incorporating an ink prepared as disclosed herein into an ink jet printing apparatus, ejecting ink droplets in an imagewise pattern onto an intermediate transfer member, heating the image to partially or completely remove solvents, optionally partially curing and transferring the ink in the imagewise pattern from the intermediate transfer member to a final recording substrate, followed by curing to form a robust image. In a specific embodiment, the intermediate transfer member is heated to a temperature above that of the final recording sheet and below that of the ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

The intermediate-transfer member may take any suitable form, such as a drum or belt. The member surface may be at room temperature, although in embodiments the member may be heated to have a surface temperature. Once upon the intermediate-transfer member surface, and after partially or fully drying, the jetted ink composition may be exposed to radiation to a limited extent (i.e., partially cured) so as to effect a limited curing of the ink upon the intermediate-transfer member surface. This intermediate curing is not to cure the ink composition to its full extent, but merely to assist in setting the jetted ink, which requires the ink droplets to have a certain viscosity before transfer. For controlling the extent of the curing if an intermediate cure is practiced, reference is made to Co-pending application Ser. Nos. 11/034,850 and 11/005,991, each incorporated herein by reference.

This intermediate-curing step is not necessary in embodiments in which the gel state is sufficient to impart the desired viscosity to the ink droplets.

Following jetting to the intermediate-transfer member and optional intermediate curing thereon, the ink composition is thereafter transferred to an image receiving substrate. The substrate may be any suitable material such as paper, non-porous flexible food packaging substrates, adhesives for food packaging paper, foil-laminating fabric, plastic, glass, metal, etc. Following transfer to the substrate, the ink composition is then cured by exposing the image on the substrate to radiation. For example, radiation having an appropriate wavelength, mainly the wavelength at which the ink initiator absorbs radiation, may be used. This initiates the curing reaction of the ink composition. The radiation exposure need not be long, and may occur for example, about 0.05 to about 10 seconds, such as from about 0.2 to about 2 seconds. These exposure times are more often expressed as substrate speeds of the ink composition passing under a UV lamp. For example, the microwave energized, doped mercury bulbs available from UV Fusion are placed in an elliptical mirror assembly that is 10 cm wide; multiple units may be placed in series. Thus, a belt speed of 0.1 ms-1 would require 1 second for a point on an image to pass under a single unit, while a belt speed 4.0 ms-1 would require 0.2 seconds to pass under four bulb assemblies. The energy source used to initiate crosslinking of the radiation curable components of the composition can be actinic, for example, radiation having a wavelength in the ultraviolet or visible region of the spectrum, accelerated particles, for example, electron beam radiation, thermal, for example, heat or infrared radiation, or the like. In embodiments, the energy is actinic radiation because such energy provides excellent control over the initiation and rate of crosslinking. Suitable sources of actinic radiation include mercury lamps, xenon lamps, carbon arc lamps, tungsten filament lamps, lasers, light emitting diodes, sunlight, electron beam emitters and the like. The curing light may be filtered, if desired or necessary. The curable components of the ink composition react to from a cured or cross-linked network of appropriate hardness. In embodiments, the curing is substantially complete to complete, i.e., at least 75% of the curable components are cured (reacted and/or cross-linked). This allows the ink composition to be substantially hardened, and thereby to be much more scratch resistant.

Transfer from the intermediate-transfer member to the final recording substrate can be made by any desired or suitable method, such as by passing the final recording substrate through a nip formed by the intermediate-transfer member and a back member, which can be of any desired or effective configuration, such as a drum or roller, a belt or web, a flat surface or platen, or the like. Transfer can be carried out at any desired or effective nip pressure, for example from about 5 pounds per square inch to about 2,000 pounds per square inch, such as from about 10 to about 200 pounds per square inch. The transfer surface may be hard or soft and compliant. Subsequent to transfer, the image on the substrate is cured. The radiation to cure the photo-polymerizable components of the ink composition may be provided by a variety of possible techniques, including but not limited to a xenon lamp, laser light, medium pressure mercury lamps, micro-wave excited mercury lamps often known as a H bulb, doped mercury lamps often referred to as D or V bulbs, LED etc. Without being limited to any specific theory, it is believed that in this embodiment, the ink composition is transferred to the final recording substrate in a semi-solid state.

The present disclosure provides a method of printing with an emulsified UV curable ink of the present embodiments. The method includes providing an emulsified UV curable ink of the present embodiments; applying the ink to an intermediate substrate; partially or fully removing water from the ink; optionally exposing the ink to a UV light to partially polymerize the radiation curable material; transferring the ink from the intermediate substrate to a final substrate; and exposing the ink to a UV light to induce complete crosslinking to form an image. The first UV light may be used for pre-curing of the radiation curable materials. During the pre-curing step, the monomers/oligomers may be partially polymerized to form an ink film on the intermediate transfer substrate. Pre-curing of the transient image may increase the cohesion of the ink film and allows for more efficient ink transfer from the intermediate substrate to final substrate.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Synthesis of Amide Gellant Precursor

An amide gellant precursor using a EDA:Pripol ratio of about 1.125:2 was prepared as follows. To a 2 L stainless steel reactor equipped with baffles and 4-blade impeller was added Pripol™ 1009 dimer diacid (Cognis Corporation) (703.1 g, acid number=194 mg/g, 1215 mmol). The reactor was purged with argon and heated to 90° C., and the impeller was turned on to 400 RPM. Next, ethylenediamine (Huntsman Chemical Corporation, 21.9 g, 364 mmol) was slowly added through a feed line directly into the reactor over 15 minutes. The reactor temperature was set at 95° C. Next, the reactor temperature was ramped up to 165° C. over 280 minutes, and held at 165° C. for 1 hour. Finally, the molten organoamide product was discharged into a foil pan and allowed to cool to room temperature. The product was an amber-coloured solid resin having an acid number of 133.7.

Example 2
Preparation of Amide Gellant
The synthesis of an amide gellant is shown below in Scheme 2. It involves an end-capping of the acid termini of the oligomers with phenyl glycol.
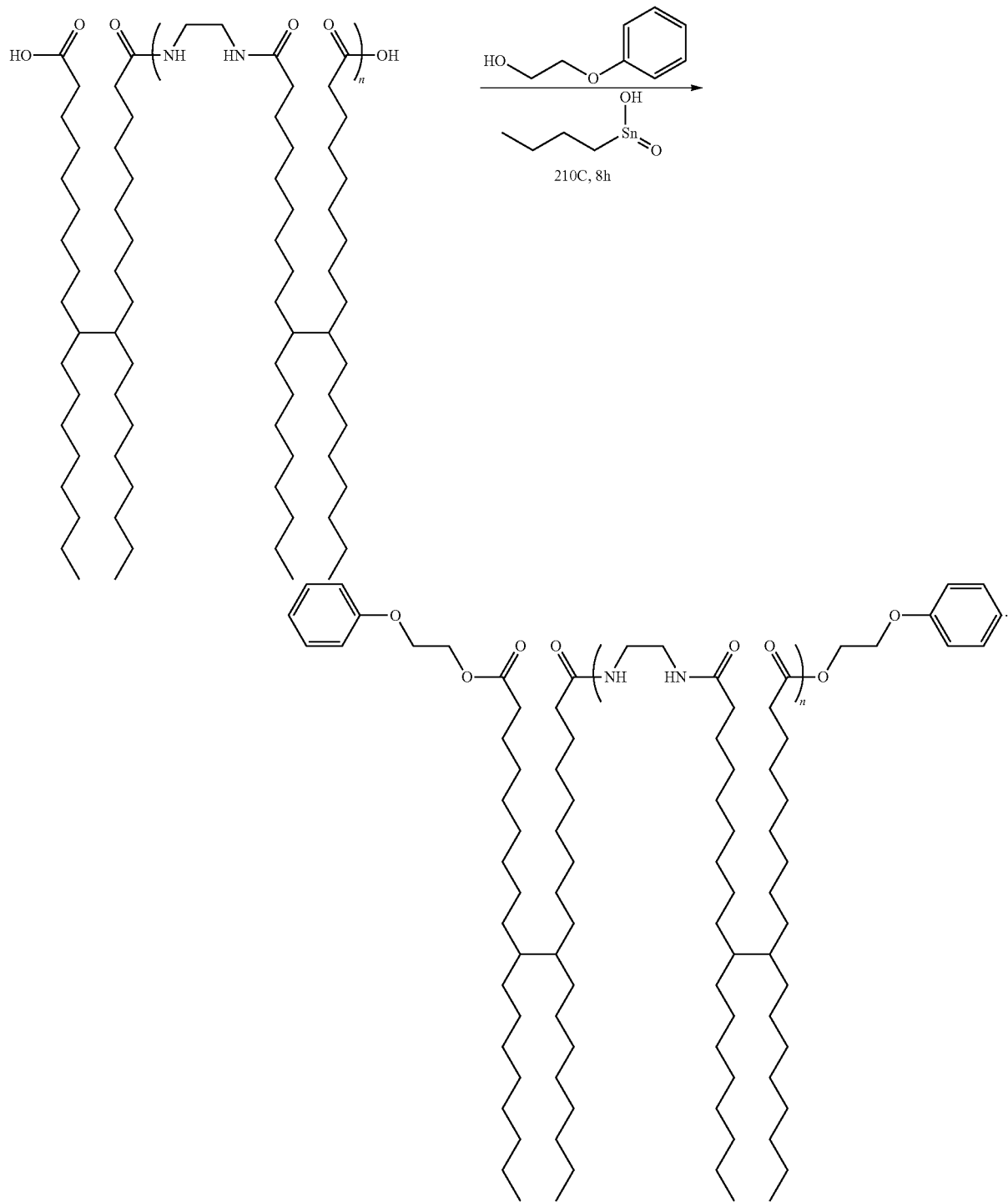
wherein n is 0, 1, 2, and 3

Table 2 below shows the MW oligomeric distributions for the amide gellant.

TABLE 2

| n | Name | Amide Gellant wt % distribution |
|---|------|---------------------------------|
| 0 | Unimer | 26.7 |
| 1 | Dimer | 57.6 |
| 2 | Trimer | 14.7 |
| 3 | Tetramer | 0.9 |

A baseline amide gellant precursor using a EDA:Pripol ratio of about 1.125:2 was prepared as follows. To a 2 L stainless steel Buchi reactor equipped with 4-blade steel impeller, baffle, and condenser was added organoamide (711.8 g, acid number=133.7, 614.65 mmol) via the addition port, using a heat gun to melt the materials. Next, the reactor was purged with $N_2$ gas at 3 SCFH (standard cubic feet per hour) flow rate, and heated to 210° C., and mixing at 450 RPM was started. Next, 2-phenoxyethanol (281.2 g, 2035.4 mmol, Aldrich Chemicals) and Fascat® 4100 (0.70 g, 2.05 mmol, Arkema Inc.) were premixed in a beaker, and added to the reaction. The reaction port was closed, and the reaction was held at 210° C. for 2.5 hours. After 2.5 hours, the reactor port was opened, and 27.5 g more phenoxyethanol was added, and the reaction was allowed to run for 4 hours. After the reaction was completed, the molten gellant product was discharged into a foil pan and allowed to cool to room temperature. The produce was an amber-colored firm gel. Acid number=3.9.

Example 3

Synthesis of UNILIN® 350 Acrylate at 5 gal Scale

About 5.4 kg of UNILIN® 350, 6.8 g of hydroquinone, 53.5 g of p-toluene sulfonic acid and 1.1 kg of toluene were charged through the charge port into a reactor. The charge port was closed and the reactor was heated to a jacket temperature of 120° C. Agitation was begun at minimum once the reactor contents reached a temperature of approximately 65° C. Once the internal reactor temperature reached 85° C., signaling that the solids have melted, agitation was increased to 150 RPM. The final two reagents were added via a Pope tank (Pope Scientific, Inc.). First, 1.32 kg of acrylic acid was added and then the Pope tank and lines of the Pope tank were rinsed through the reactor with 1.1 kg of toluene. The time of acrylic acid addition was marked as time zero. The jacket temperature was then ramped from 120° C. to 145° C. over 120 minutes manually with an increase of $2^2$C every 10 minutes. During that time, reaction condensate (water) was cooled and collected by a condenser. Approximately 200 g of water were collected. Also, approximately 1.1 kg of toluene (50% of the charge) were removed by distillation along with the reaction condensate.

Once the reactor jacket reached the maximum temperature of 145° C., cooling was begun to bring the reactor to a batch temperature of 95° C. Agitation was reduced to 115 rpm. About 23 kg of deionized water ("DIW") were brought to boil and then charged to the reactor via the Pope tank (temperature of water by the time of transfer was greater than 90° C.). Mixing continued for 30 seconds and, after mixing was stopped, the water and waxy acrylate phases were allowed to separate. The bottom (water) phase was discharged to a steel pail from the bottom valve using the sight glass to monitor the interface. The extraction procedure was repeated with another 2.7 kg of hot DIW and the water discharged to a pail. A third and final extraction was conducted with 10 kg of hot DIW, separated but not discharged to a pail. Instead, the hot water layer was used to preheat the discharge line to a vacuum filter.

At the start of the experiment day, preparations were made to a vacuum filter for the discharge and precipitation steps. The filter was charged with 100 kg of DIW. Deionized cold water cooling and agitation at minimum were begun to the jacket of the filter to facilitate cooling the DIW to less than 10° C. for product solidification.

Following the third extraction, maximum agitation was begun to the filter. The reactor, the filter and the discharge lines were all checked for proper bonding and grounding, and both vessels were purged with nitrogen to ensure an inert atmosphere. The reactor was isolated and a moderate nitrogen blanket on the filter was begun, and was maintained throughout the discharge procedure.

After the final 10 minutes of separation time and once Tr=95° C., 5 kPa of nitrogen pressure were applied to the reactor. That ensured an inert atmosphere throughout the discharge procedure. The bottom valve was opened slightly and the hot reactor contents were slowly poured into the filter. The first layer was water and the next layer, the desired UNILIN® 350 acrylate, which solidified into yellowish white particles. Once the discharge was complete, all nitrogen purges was stopped and both vessels vented to the atmosphere. Agitation continued on the filter for approximately 10 minutes. A flexible transfer line was connected from the central vacuum system to a waste receiver. Full vacuum was applied to the waste receiver, then the bottom valve of the filter was opened to vacuum transfer the water filtrate.

Once a dried sample of the material had an acid number of <1.5, the batch was discharged by hand into foil-lined trays, and dried in a vacuum oven at 55° C. with full vacuum overnight. The next day, the dry material was discharged and stored in 5 gallon pails. The yield from the batch was approximately 5.2 kg.

Example 4

Cyan Pigment Dispersion Preparation

Into a 1 liter Attritor (Union Process) was added 1200 grams stainless steel shot (⅛ inch diameter), 30 grams B4G cyan pigment (Clariant), 18 grams EFKA® 4340 dispersant, neat (BASF), and 152 grams SR9003 monomer (Sartomer). The mixture was stirred for 18 hours at 400 RPM, and then discharged into a 200 mL container. The resulting pigment dispersion has a pigment concentration of about 15 weight percent.

Example 5

UV Curable Gel Material Preparation

About 7.5 g of amide gellant, 5 g of Unilin® 350 acrylate, 3 g of Irgacure® 379 (Ciba), 1 g of Irgacure® 819, 3.5 g of Irgacure® 127, 0.2 g of Irgastab® UV10, 5 g of SR399LV (Sartomer Company, Inc.), 54.8 g of SR833S (Sartomer Company, Inc.) were mixed at 90° C. for 1 h. This material was filtered through a 1 μm stacked filter. The filtered material was added to a colorant mixture as shown in Table 2 and additional SR833S as required to make-up the mass balance, while stirring at 90° C. The resulting pigmented material is stirred at 90° C. for 2 h, before filtration through a 1 μm filter.

TABLE 2

| Component | wt % | Mass |
|---|---|---|
| Amide gellant | 7.5% | 7.50 |
| Unilin 350-acrylate | 5.0% | 5.00 |
| SR399LV | 5.0% | 5.00 |
| SR833S | 54.8% | 54.80 |
| Irgacure 379 | 3.0% | 3.00 |
| Irgacure 819 | 1.0% | 1.00 |
| Irgacure 127 | 3.5% | 3.50 |
| Irgastab UV10 | 0.2% | 0.20 |
| Cyan pigment dispersion | 20.0% | 20.00 |
| 15 wt % pigment | | |
| TOTAL | 100.0% | 100.00 |

Example 6

Prophetic Example: Preparation of Ink Formulation A (Emulsifying UV Curable Gel Materials into a Mixture of Distilled Water and Humectants)

The cyan UV curable gel material described above in Example 5 (20.8 wt %, 207.7 g) and Neogen RK™ anionic surfactant comprising primarily branched sodium dodecyl benzenene sulphonate (2.0 wt %, 20 g) are added to deionized water (43.2 wt %, 432 g), sulfalone (28.3 wt %, 283 g) and 2-pyrrolidinone (5.7 wt %, 57 g) in a reactor, heated to 90° C. under pressure and stirred at about 400 RPM. The aqueous mixture containing the insoluble UV curable gel material is then pumped through a Gaulin 15MR piston homogenizer at about 1 L/min for a period of about 30 minutes with the primary homogenizing valve full open and the secondary homogenizing valve partially closed such that the homogenizing pressure is about 1,000 psi. Then, the primary homogenizing valve is partially closed such that the homogenizing pressure increases to about 8,000 psi. The reactor mixture is kept at about 90° C. and circulated through the homogenizer at about 1 L/min for about 60 minutes. Thereafter, the homogenizer is stopped and the reactor mixture is cooled to room temperature at about −15° C. per minute and discharged into a product container. The final product is an aqueous UV curable ink comprising the emulsified UV curable gel material as particles of about 200 nanometers. Formulation A is applied via inkjet 1 (see, FIG. 1) onto an intermediate receiving member 5 (e.g., a drum) having a higher surface energy than the liquid ink surface tension.

After the ink is jetted onto the intermediate substrate 5, the ink is heated by a heater device 3 to remove water and induce film formation by the UV curable gel component. The film is then transferred to the substrate 5 through contact under pressure. Optionally, the image may be partially cured by UV light 4 prior to transfer to reduce film splitting as required. The transferred image 9 is then further subjected to UV irradiation 6 to induce complete crosslinking thereby resulting in an extremely robust image. Image robustness is especially important for packaging applications such as folding carton, for example.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. An emulsified UV curable ink for use in an indirect printing process comprising:

water;

a curable monomer;

a photoinitiator; and an amide gellant having the formula

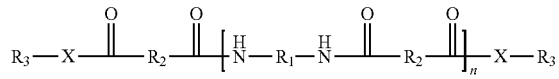

wherein $R_1$ is: (i) an alkylene group having from 1 to about 20 carbon atoms, (ii) an arylene group having from about 5 to about 20 carbon atoms, (iii) an arylalkylene group having from about 6 to about 32 carbon, or (iv) an alkylarylene group having from about 6 to about 32 carbon atoms;

$R_2$ is: (i) alkylene groups having from 1 to about 54 carbon atoms, (ii) arylene groups having from 5 to about 14 carbon atoms in the arylene chain, (iii) arylalkylene groups having from about 6 to about 32 carbon atoms, or (iv) alkylarylene groups having from about 6 to about 32 carbon;

$R_3$ is: (i) alkyl groups, (ii) aryl groups, (iii) arylalkyl groups, or (iv) alkylaryl groups;

X is an oxygen atom or a group of the formula —$NR_4$—, wherein $R_4$ is: (i) a hydrogen atom, (ii) an alkyl group, (iii) an aryl group, (iv) an arylalkyl group, or (v) an alkylaryl group; and n is from 2 to 20;

wherein the ink has a surface tension of from about 18 to about 50 mN/m and a viscosity of from about 2 centipoise to about 20 centipoise at the jetting temperature.

2. The ink of claim 1, wherein the amide gellant is present in an amount of from about 0.5 to about 2.5 weight percent based on the total weight of the emulsified UV curable ink.

3. The ink of claim 1, wherein the curable monomer is selected from the group consisting of methacrylate monomer, acrylate monomer, dimethacrylate monomer, diacrylate monomer, triacrylate monomer, and mixtures thereof.

4. The ink of claim 1, wherein the curable monomer is present in an amount of from about 15 to about 20 weight percent based on the total weight of the emulsified UV curable ink.

5. The ink of claim 1, wherein the photoinitiator is selected from the group consisting of hydroxyketones, benzophenone, acyl phosphine oxides, phenylglyoxylates, and mixtures thereof.

6. The ink of claim 1 further comprising a surfactant selected from the group consisting of ionic surfactants, anionic surfactants, cationic surfactants, nonionic surfactants, zwitterionic surfactants, and mixtures thereof.

7. The ink of claim 6, wherein the surfactant is anionic.

8. The ink of claim 6, wherein the surfactant is present in the amount of from about 0.1% to about 5% by weight based on the total weight of the emulsified UV curable ink.

9. The ink of claim 1 further comprising a colorant selected from the group consisting of pigment, dye, mixtures of pigment and dye, mixtures of pigments, and mixtures of dyes.

10. An emulsified UV curable ink for use in an indirect printing process comprising:
  water;
  a curable monomer;
  a photoinitiator; and
  an amide gellant having the formula

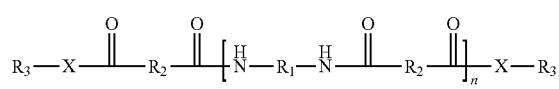

wherein $R_1$ is an alkylene group, $R_2$ is an alkylene group, and $R_3$ has a formula of $-(CH_2)_p-O-A$ wherein A is a substituted aryl or non-substituted aryl, x is 0, and n is from 2 to 5; wherein the ink has a surface tension of from about 18 to about 50 mN/m and a viscosity of from about 2 centipoise to about 20 centipoise at the jetting temperature.

11. The ink of claim 10, wherein the amide gellant is present in an amount of from about 0.5 to about 2.5 weight percent based on the total weight of the ink.

12. The ink of claim 10, wherein the curable monomer is selected from the group consisting of methacrylate monomer, acrylate monomer, dimethacrylate monomer, diacrylate monomer, triacrylate monomer, and mixtures thereof.

13. The ink of claim 10, wherein the curable monomer is present in an amount of from about 15 to about 20 weight percent based on the total weight of the ink.

14. The ink of claim 10, wherein the photoinitiator is selected from the group consisting of hydroxyketones, benzophenone, acyl phosphine oxides, phenylglyoxylates, and mixtures thereof.

15. An emulsified UV curable ink for use in an indirect printing process comprising:
  water;
  a curable monomer;
  a photoinitiator; and
  an amide gellant having the formula

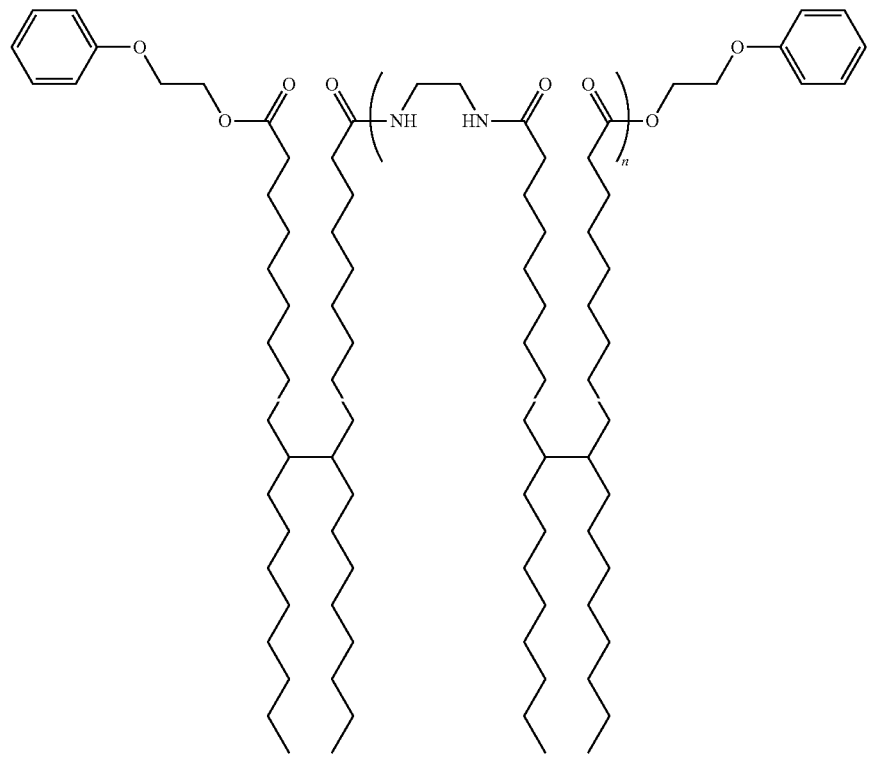

wherein n is from 2 to 20; wherein the ink has a surface tension of from about 18 to about 50 mN/m and a viscosity of from about 2 centipoise to about 20 centipoise at the jetting temperature.

16. The ink of claim 15, wherein n is from 2 to 5.

17. The ink of claim 15, wherein the amide gellant is present in an amount of from about 0.5 to about 2.5 weight percent based on the total weight of the ink.

18. The ink of claim 15, wherein the curable monomer is selected from the group consisting of methacrylate monomer, acrylate monomer, dimethacrylate monomer, diacrylate monomer, triacrylate monomer, and mixtures thereof.

19. The ink of claim 15, wherein the curable monomer is present in an amount of from about 15 to about 20 weight percent based on the total weight of the ink.

20. The ink of claim 15, wherein the photoinitiator is selected from the group consisting of hydroxyketones, benzophenone, acyl phosphine oxides, phenylglyoxylates, and mixtures thereof.

* * * * *